United States Patent
Serizawa et al.

(10) Patent No.: US 8,928,709 B2
(45) Date of Patent: Jan. 6, 2015

(54) OPTICAL SCANNER AND IMAGE FORMING APPARATUS INCLUDING SAME

(75) Inventors: Keiichi Serizawa, Kanagawa (JP); Kazunori Watanabe, Tokyo (JP); Hiroshi Johno, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 119 days.

(21) Appl. No.: 13/357,262

(22) Filed: Jan. 24, 2012

(65) Prior Publication Data

US 2012/0200655 A1  Aug. 9, 2012

(30) Foreign Application Priority Data

Feb. 7, 2011  (JP) .................................. 2011-024267

(51) Int. Cl.
| | |
|---|---|
| B41J 2/385 | (2006.01) |
| B41J 2/41 | (2006.01) |
| B41J 2/435 | (2006.01) |
| B41J 2/47 | (2006.01) |
| G03G 21/16 | (2006.01) |
| G02B 26/12 | (2006.01) |

(52) U.S. Cl.
CPC ............. B41J 2/471 (2013.01); G03G 21/1666 (2013.01); G02B 26/123 (2013.01)
USPC ........... 347/138; 347/130; 347/137; 347/152; 347/245; 347/263

(58) Field of Classification Search
CPC .............. B41J 2/385; B41J 2/41; B41J 2/435; B41J 2/473; B41J 2/471; B41J 2/44; B41J 2/45
USPC .................. 347/130, 137, 138, 152, 245, 263
See application file for complete search history.

(56) References Cited

U.S. PATENT DOCUMENTS

| | | | |
|---|---|---|---|
| 6,283,371 | B1 * | 9/2001 | Son .......................... 235/462.32 |
| 2002/0075916 | A1 * | 6/2002 | Sato et al. ....................... 372/36 |
| 2006/0092997 | A1 * | 5/2006 | Lee ................................. 372/24 |
| 2008/0239433 | A1 * | 10/2008 | Amada et al. .................. 359/204 |

FOREIGN PATENT DOCUMENTS

| | | |
|---|---|---|
| JP | 3-040785 A | 2/1991 |
| JP | 05-072457 A | 3/1993 |
| JP | 9-218368 A | 2/1997 |
| JP | 2001111155 A | 4/2001 |
| JP | 2006350251 A | 12/2006 |
| JP | 2007-171626 A | 7/2007 |
| JP | 2008-096957 A | 4/2008 |
| JP | 2008-102291 A | 5/2008 |
| JP | 2010-026146 A | 2/2010 |

* cited by examiner

Primary Examiner — Justin Seo
Assistant Examiner — Kendrick Liu
(74) Attorney, Agent, or Firm — Harness, Dickey & Pierce, P.L.C.

(57) ABSTRACT

An optical scanner includes a light source, an optical part, an enclosure, and a retainer. The light source projects light against a target. The optical part is disposed on a light path between the light source and the target. The enclosure houses the light source and the optical part. The retainer is fixed to the enclosure and includes a plurality of optical part mounts of identical shape and different sizes. The optical part is adhered to one of the plurality of optical part mounts.

12 Claims, 12 Drawing Sheets

FIG. 20
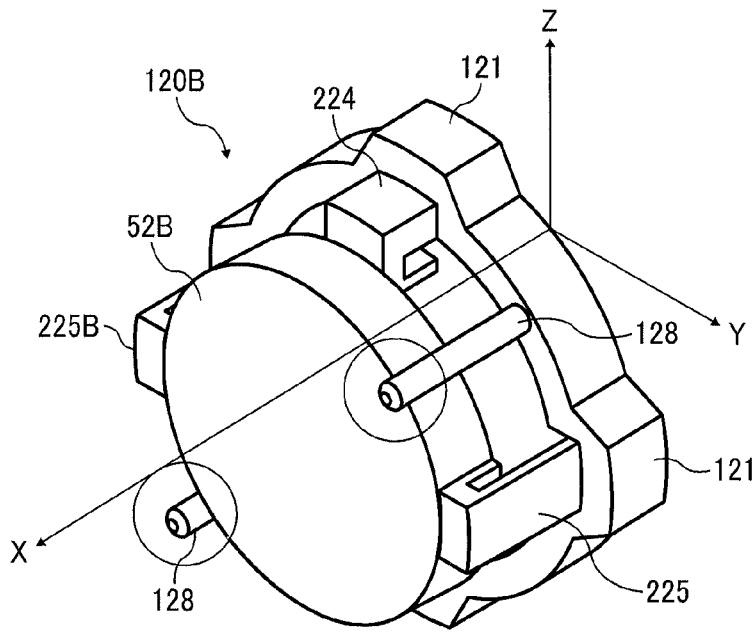
FIG. 21A
FIG. 21B
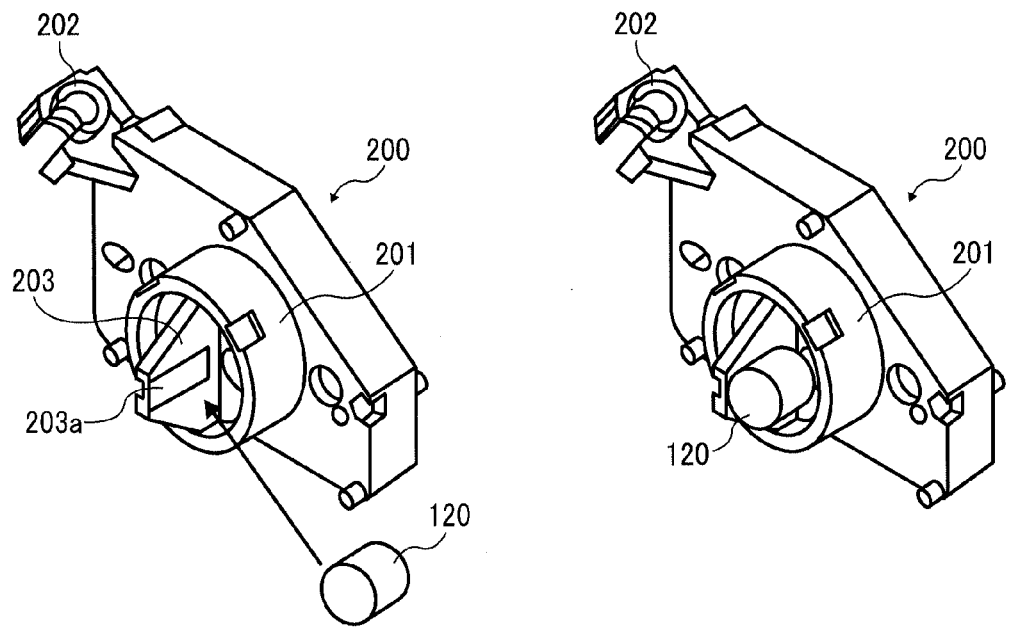

OPTICAL SCANNER AND IMAGE FORMING APPARATUS INCLUDING SAME

CROSS-REFERENCE TO RELATED APPLICATION

This patent application is based on and claims priority pursuant to 35 U.S.C. §119 to Japanese Patent Application No. 2011-024267, filed on Feb. 7, 2011 in the Japanese Patent Office, the entire disclosure of which is hereby incorporated by reference herein.

BACKGROUND OF THE INVENTION

1. Field of the Invention

Exemplary aspects of the present disclosure generally relate to an optical scanner and an image forming apparatus including same.

2. Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member; an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Typically, an image forming apparatus is equipped with an optical writing unit serving as an optical scanner to form a latent image on an image bearing member, for example, a photoconductive drum. The optical writing unit illuminates and scans the image bearing member with a light beam also known as a write light based on image information. Subsequently, the latent image is developed with toner, thereby forming a visible image, also known as a toner image.

Generally, such an optical writing unit includes a light source to project the light beam, optical parts such as a collimating lens, a scanning lens, a reflective mirror, and a polygon mirror. The light beam projected from the light source such as a laser diode (LD) passes through the collimating lens attached to a housing of the optical writing unit. The collimating lens shapes the light beam into a desired shape. Then, the light beam strikes the polygon mirror. The light beam is deflected and scanned by the polygon mirror, and passes through the scanning lens, the reflective mirror, and so forth. Ultimately, the light beam illuminates the image bearing member. In general, the collimating lens is fixed directly to the housing an adhesive agent.

Due to heightened awareness of environmental problems in recent years, there is increasing market demand for recycling the optical parts used in the optical writing unit. However, the optical parts such as the collimating lens are fixed directly and firmly to the housing adhesives to prevent the optical parts from displacement during and/or after shipment, thereby complicating efforts to separate the optical parts from the housing for recycling. For example, the optical parts need to be handled directly and separated forcibly.

The optical parts have finely processed surfaces that receive or project light so as to obtain certain optical characteristics. Such optical parts are very sensitive to damage and mechanical stress. When separating the optical parts from the housing upon recycling, the optical parts may be damaged, causing undesirable changes in the optical characteristics of the optical parts. For this reason, the optical parts are difficult to recycle, and hence are usually discarded.

To address such a difficulty, JP-2001-111155-A, for example, proposes a collimating lens removably attached to a light source unit. More specifically, the collimating lens is held by a lens barrel serving as a lens holder, and the lens barrel holding the collimating lens is fixed to the light source unit. When removing the collimating lens from the light source unit, the lens barrel is handled directly and separated from the light source unit. With this configuration, the lens barrel is the only place that is directly handled and separated from the light source unit or the housing, thereby preventing the lens surface of the collimating lens from getting damaged. Further, no stress is applied to the collimating lens upon separation from the light source unit. As a result, fluctuation of the optical characteristics of the collimating lens is prevented, and hence the collimating lens can be recycled.

As is generally the case for the collimating lens, when a configuration of the optical scanner, for example, a beam spot diameter, changes, the external diameter of the collimating lens changes accordingly. According to the related art, the inner diameter of the lens barrel for the collimating lens is almost the same as the external diameter of the collimating lens, and the collimating lens is inserted into the lens barrel. Consequently, if the external diameter of the collimating lens changes, a different lens barrel is needed to accommodate the collimating lens in a different size, thus increasing cost of manufacturing and necessitating management of different lens barrels. More specifically, a manufacturing line for different lens barrels or the holders needs to be established, resulting in a significant cost increase.

In view of the above, there is an unsolved need for optical parts that can be recycled easily and inexpensively without getting damaged.

BRIEF SUMMARY

In view of the foregoing, in an aspect of this disclosure, an optical scanner includes a light source, an optical part, an enclosure, and a retainer. The light source projects light against a target. The optical part is disposed on a light path between the light source and the target. The enclosure houses the light source and the optical part. The retainer is fixed to the enclosure and includes a plurality of optical part mounts of identical shape and different sizes. The optical part is adhered to one of the plurality of optical part mounts.

According to another aspect, an image forming apparatus includes an image bearing member, the optical scanner, and a developing device. The image bearing member bears a latent image on a surface thereof. The optical scanner illuminates the surface of the image bearing member with light to form the latent image thereon. The developing device develops the latent image formed on the image bearing member using toner.

The aforementioned and other aspects, features and advantages would be more fully apparent from the following detailed description of illustrative embodiments, the accompanying drawings, and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein:

FIG. 20 is a perspective view schematically illustrating the lens retainer of the third illustrative embodiment including a projection;

FIG. 21A is a perspective view schematically illustrating an LD unit before the lens retainer is attached thereto, according to an illustrative embodiment; and FIG. 21B is a perspective view schematically illustrating an LD unit after the lens retainer is attached thereto.

DETAILED DESCRIPTION OF DISCLOSED EMBODIMENTS

Figure 1:
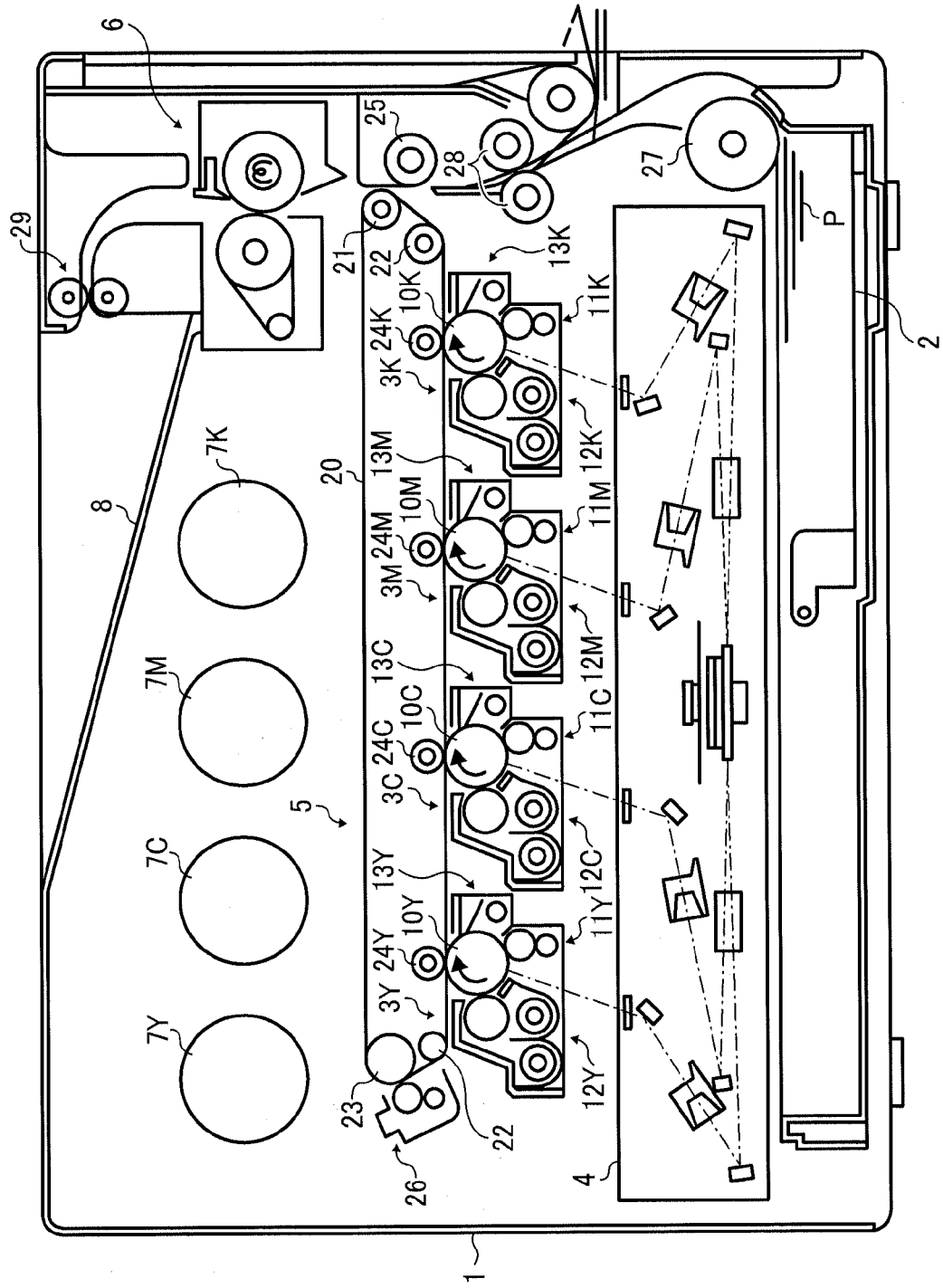
FIG. 1 is a schematic diagram illustrating a printer as an example of an image forming apparatus, according to an illustrative embodiment of the present invention.

A description is now given of illustrative embodiments of the present application. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially with reference to FIG. 1, a description is provided of an electrophotographic color laser printer as an example of an image forming apparatus according to an aspect of the disclosure.

FIG. 1 is a schematic diagram illustrating a printer as an example of an image forming apparatus. The image forming apparatus includes a housing 1 and a sheet cassette 2, image forming stations 3Y, 3C, 3M, and 3K, an optical writing unit 4, an intermediate transfer unit 5, a fixing device 6, toner bottles 7Y, 7C, 7M, and 7K, and so forth. The sheet cassette 2 is detachable from the housing 1 and disposed at the bottom of the housing 1. The image forming stations 3Y, 3C, 3M, and 3K are disposed substantially at the center of the housing 1.

The image forming stations 3Y, 3C, 3M, and 3K form toner images, also known as visible images, of yellow (Y), cyan (C), magenta (M), and black (K), respectively.

It is to be noted that reference characters Y, C, M, and K denote colors yellow, cyan, magenta, and black, respectively. To simplify the description, the reference characters Y, C, M, and K indicating colors are omitted herein unless otherwise specified.

Figure 2:
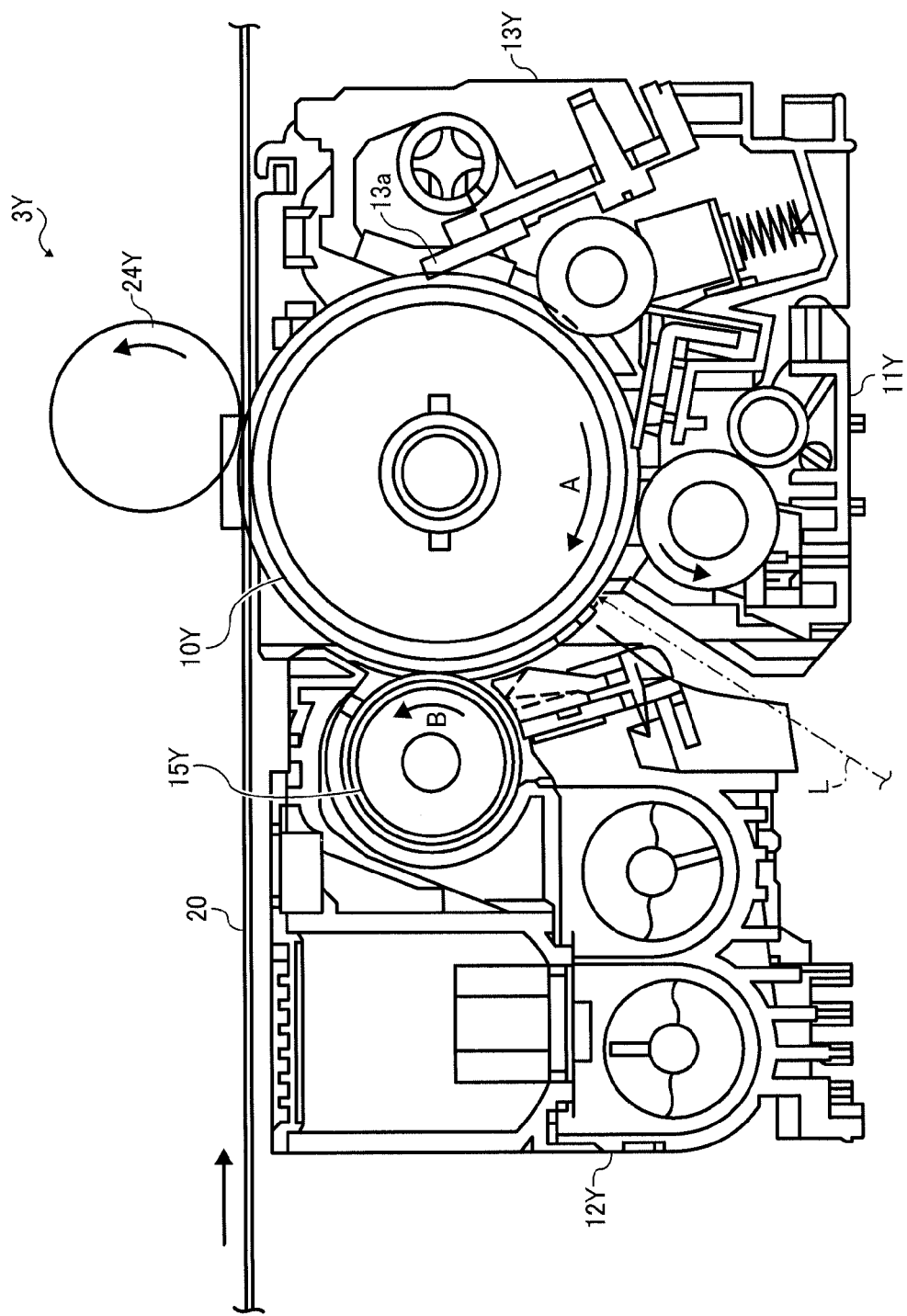
FIG. 2 is a schematic diagram illustrating an image forming station for yellow employed in the image forming apparatus of FIG. 1.

With reference to FIG. 2, a description is provided of one of the image forming stations 3Y, 3C, 3M, and 3K. FIG. 2 is a schematic enlarged diagram illustrating the image forming station 3Y for yellow. It is to be noted that the image forming stations 3Y, 3C, 3M, and 3K all have the same configuration as all the others, differing only in the color of toner employed. Thus, the description is provided of the image forming station 3Y as a representative example of the image forming stations.

As illustrated in FIGS. 1 and 2, the image forming station 3Y includes a photoconductive drum 10Y serving as a latent image bearing member that rotates in a direction indicated by an arrow A. The photoconductive drum 10Y is formed of an aluminum cylinder base having a diameter approximately 40 mm covered with a photosensitive layer, for example, an organic photoconductive (OPC) layer. As illustrated in FIG. 2, in the image forming station 3Y, the photoconductive drum 10Y is surrounded by various pieces of imaging equipment, such as a charging device 11Y, a developing device 12Y, a primary transfer roller 24Y, a drum cleaner 13a, and a charge neutralizing device (not illustrated). The charging device 11Y charges the surface of the photoconductive drum 10Y. The developing device 12Y develops the electrostatic latent image on the surface of photoconductive drum 11Y with toner of yellow, thereby forming a visible image, also known as a toner image of yellow. The drum cleaner 13Y removes residual toner remaining on the surface of the photoconductive drum 1Y after transfer process.

The optical writing unit 4 serving as an optical scanner is disposed substantially below the image forming stations 3Y, 3C, 3M, and 3K. The optical writing unit 4 illuminates the photoconductive drums 10Y, 10C, 10M, and 10K with a write light beam L to optically scan the photoconductive drums 10Y, 10C, 10M, and 10K. The intermediate transfer unit 5 is disposed substantially above the image forming stations 3Y, 3C, 3M, and 3K. The intermediate transfer unit 5 includes an intermediate transfer belt 20 wound around a plurality of rollers and formed into a loop. Toner images formed in the image forming stations 3Y, 3C, 3M, and 3K are transferred onto the intermediate transfer belt 20. The fixing device 6 fixes the toner images transferred onto a recording medium P from the intermediate transfer belt 20.

The toner bottles 7Y, 7C, 7M, and 7K storing toner of yellow, cyan, magenta, and black, respectively, are disposed substantially at an upper portion of the housing 1. The toner bottles 7Y, 7C, 7M, and 7K are removably installed in the housing 1. The toner bottles 7Y, 7C, 7M, and 7K can be removed from the housing 1 by opening a sheet discharge tray 8 provided at the upper portion of the housing 1.

The optical writing unit 4 includes a laser diode serving as a light source. The laser diode projects the write light beam L against polygon mirrors 41a and 41b (shown in FIG. 3). The polygon mirrors 41a and 41b are a regular polygonal prism including multiple mirror surfaces. The write light beam L projected from the laser diode is deflected in a main scanning direction by the mirror surfaces of the polygon mirrors 41a and 41b while rotating. Subsequently, the write light beam L reflected by the plurality of mirrors scans the photoconductive drums 10Y, 10C, 10M, and 10B which have been charged uniformly by the charging devices 11Y, 11C, 11M, and 11K. Accordingly, electrostatic latent images of yellow, cyan, magenta, and black are formed on the surfaces of the photoconductive drums 10Y, 10C, 10M, and 10K, respectively. A detailed description of the optical writing unit 4 is provided later.

The intermediate transfer belt 20 of the intermediate transfer unit 5 serving as a transfer mechanism is wound around a plurality of rollers: a drive roller 21, a tension roller 22, and a driven roller 23. The intermediate transfer belt 20 rotates in a counterclockwise direction in FIG. 2 at a predetermined speed. The intermediate transfer unit 5 includes primary transfer rollers 24Y, 24C, 24M, and 24K to primarily transfer the toner images formed on the photoconductive drums 10Y, 10C, 10M, and 10K onto the intermediate transfer belt 20 so that they are superimposed one atop the other, thereby forming a composite color toner image. The image forming apparatus includes a secondary transfer roller 25 and a belt cleaning device 26. The secondary transfer roller 25 transfers the composite color toner image from the intermediate transfer belt 20 to the recording medium P. The belt cleaning device 26 cleans the residual toner remaining on the intermediate transfer belt 20 after the transfer process.

Next, a description is provided of a color imaging process according to the illustrative embodiment.

In the image forming stations 3Y through 3K, the photoconductive drums 10Y through 10K are uniformly charged by the charging devices 11Y through 11K. Subsequently, based on image information, the photoconductive drums 10Y through 10K are scanned and exposed by the laser beam L, thereby forming electrostatic latent images thereon. The electrostatic latent images are developed with toner of the respective colors borne on developing rollers 15Y, 15C, 15M, and 15K of the developing devices 12Y, 12C, 12M, and 12K, thereby forming toner images of the colors yellow, cyan, magenta, and black.

The primary transfer rollers 24Y, 24C, 24M, and 24K transfer primarily the toner images of yellow, cyan, magenta, and black from the photoconductive drums 10Y, 10C, 10M, and 10K onto the intermediate transfer belt 20 rotating in the counterclockwise direction so that they are superimposed one atop the other, thereby forming a composite color toner image. The toner images are transferred from the photoconductive drums 10Y, 10C, 10M, and 10K onto the intermediate transfer belt 20 from the upstream to the downstream in the direction of movement of the intermediate transfer belt 20 at different timing so that the toner images are transferred at the same position on the intermediate transfer belt 20.

Each of the cleaning devices 13Y through 13K is equipped with a cleaning blade 13a (shown in FIG. 2). After the primary transfer, the cleaning blade 13a cleans the surface of the photoconductive drums 10Y through 10K in preparation for the subsequent imaging cycle.

The toner in the toner bottles 7Y, 7C, 7M, and 7K is supplied to the developing devices 12Y, 12C, 12M, and 12K of the image forming stations 3Y, 3C, 3M, and 3K via a transport path, not illustrated, as necessary.

The sheet cassette 2 accommodates multiple recording media sheets P. A recording medium P in the sheet cassette 2 is picked up and sent to a sheet conveyance path in the housing 1 by a sheet feed roller 27 disposed substantially near the sheet cassette 2. The recording medium P is temporarily stopped by a pair of registration rollers 28, and is sent to a secondary transfer portion constituted by the secondary transfer roller 25 and the intermediate transfer belt 20 at predetermined timing. In the secondary transfer portion, the composite toner image formed on the intermediate transfer belt 20 is transferred onto the recording medium P.

The recording medium P bearing the composite toner image passes through the fixing device 6 so that the composite toner image is fixed on the recording medium P. Subsequently, the recording medium P is discharged onto the sheet discharge tray 8 by a sheet discharge roller 29. Similar to the photoconductive drums 10, the residual toner remaining on the intermediate transfer belt 20 is cleaned by the belt cleaning device 26 that contacts the intermediate transfer belt 20.

Figure 3:
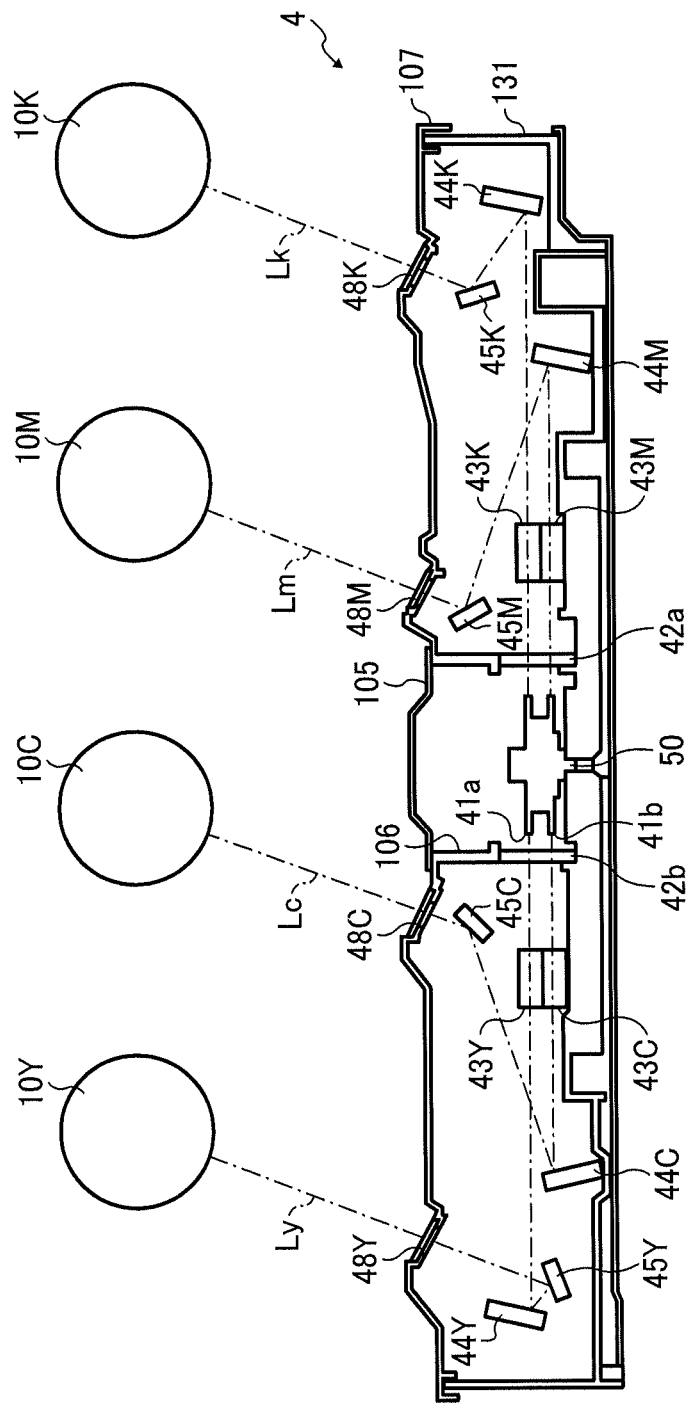
FIG. 3 is a schematic diagram illustrating an optical scanner and a plurality of image bearing members employed in the image forming apparatus, according to an illustrative embodiment of the present invention.
Figure 4:
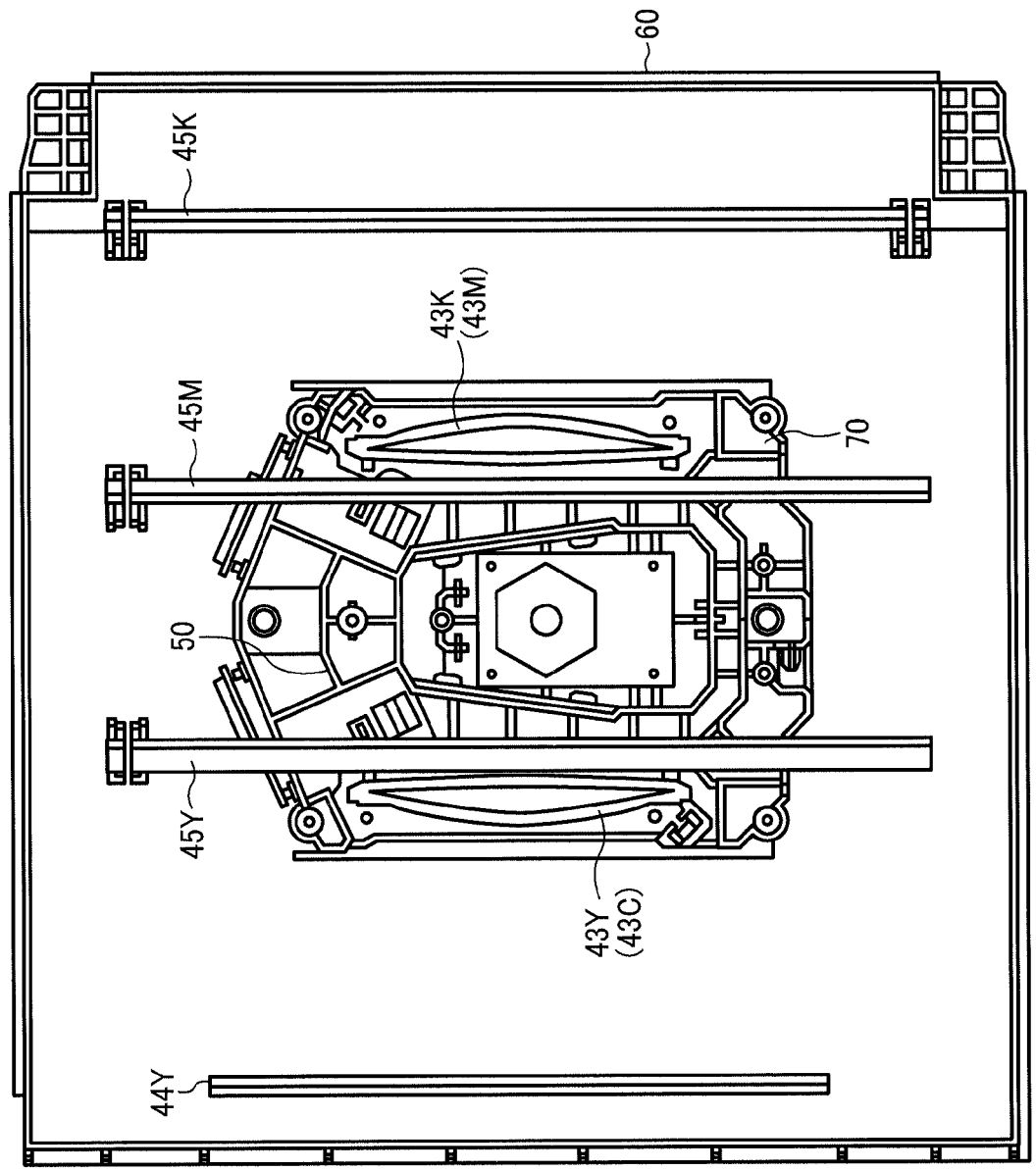
FIG. 4 is a plan view of the optical scanner of FIG. 3.
Figure 5:
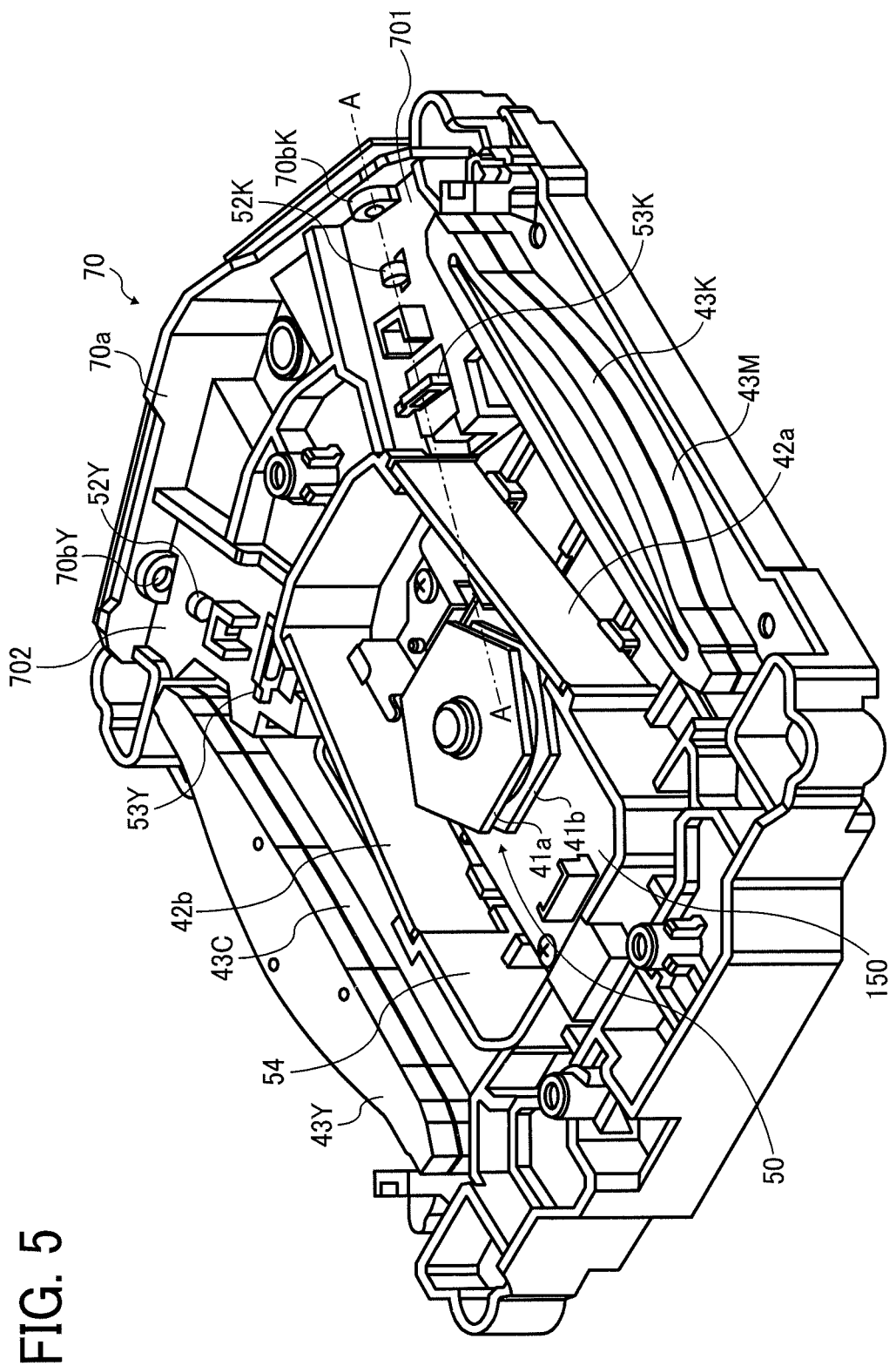
FIG. 5 is a perspective view schematically illustrating a first enclosure of the optical scanner.
Figure 6:
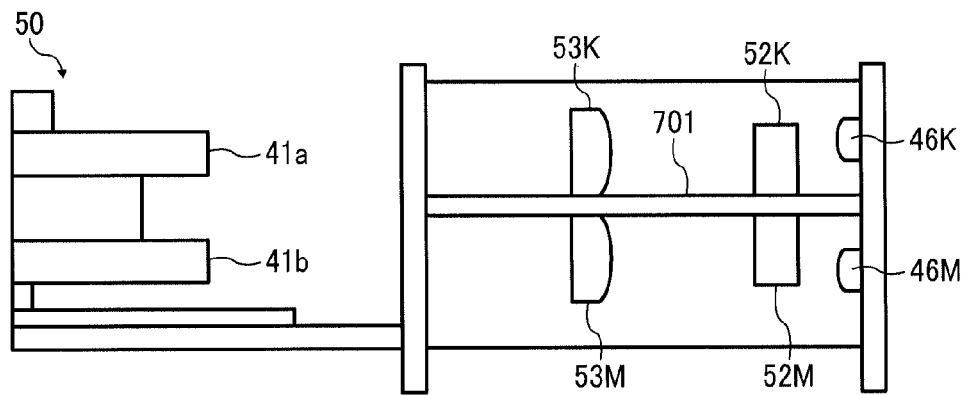
FIG. 6 is a cross-sectional view schematically illustrating the first enclosure along a line A-A in FIG. 5.

With reference to FIGS. 3 through 6, a description is provided of the optical writing unit 4. FIG. 3 is a schematic diagram illustrating the photoconductive drums 10Y through 10K and the optical writing unit 4 employed in the image forming apparatus. FIG. 4 is a plan view of the optical writing unit 4 of FIG. 3. FIG. 5 is a perspective view schematically illustrating a first enclosure 70 of the optical writing unit 4. FIG. 6 is a cross-sectional view schematically illustrating the first enclosure 70 along a line A-A in FIG. 5.

As illustrated in FIG. 3, the optical writing unit 4 serving as an optical scanner includes optical devices such as a polygon scanner 50, various reflective mirrors, lenses, and so forth. The optical devices such as the polygon scanner 50, the reflective mirrors, the lenses, and so forth are disposed in an optical housing 131. The optical housing 131 is open at the top. A cover 107 covers the top of the housing 131. The cover 107 includes dust proof glass panels 48Y, 48C, 48M, and 48K.

As illustrated in FIG. 4, the optical housing 131 consists of the first enclosure 70 and a second enclosure 60. The first enclosure 70 and the second enclosure 60 are made of resin. The first enclosure 70 encloses optical parts disposed on optical paths between the light source, and scanning lenses 43Y, 43C, 43M, and 43K. The second enclosure 60 encloses optical parts disposed on optical paths between the scanning lenses 43Y, 43C, 43M, and 43K, and the photoconductive drums 10Y, 10C, 10M, and 10K.

As illustrated in FIGS. 5 and 6, the first enclosure 70 encloses laser diodes 46Y, 46C, 46M, and 46K, collimating lenses 52Y, 52C, 52M, and 52K, cylindrical lenses 53Y, 53M, 53C, and 53K, the polygon scanner 50 serving as a rotary deflector, and the scanning lenses 43Y, 43M, 43C, and 43K. (For simplicity, the laser diodes 46Y and 46C, the collimating lens 52C, and the cylindrical lens 53C are not illustrated.)

As illustrated in FIG. 5, the polygon scanner 50 includes the polygon mirrors 41a and 41b, a polygon motor (not illustrated), and a circuit board 150 equipped with electrical parts that control the polygon motor. The six sides of each of the polygon mirrors 41a and 41b are reflective mirror surfaces. The polygon mirrors 41a and 41b are connected in a lateral direction such that the center of the regular polygonal prism of the polygon mirror 41a and the center of the regular polygonal prism of the polygon mirror 41b are aligned one atop the other, that is, are concentric. The polygon scanner 50 is fixed to a mounting portion of the first enclosure 70 surrounded by a soundproof wall 54 by a screw. The soundproof wall 54 includes two notches at which soundproof glass panel 42a and 42b are mounted.

The laser diodes 46Y, 46C, 46M, and 46K serving as light sources are attached to through-holes 70b formed in a side surface 70a of the first enclosure 70. It is to be noted that for simplicity, in FIG. 5, only a through-hole 70bK and a through-hole 70bY are illustrated. The laser diode 46K for black is attached to the through-hole 70bK, and laser diode 46Y for the color yellow is attached to the through-hole 70bY.

As illustrated in FIG. 6, the laser diode 46K for the color black is disposed above the laser diode 46M for the color magenta. The collimating lens 52K and the cylindrical lens 53K are attached to an upper surface of a first base 701. The collimating lens 52M is attached to a bottom surface of the first base 701 below the collimating lens 52K. The cylindrical lens 53M is attached to the bottom surface of the first base 701 below the cylindrical lens 53K. Similarly, although not illustrated, the laser diode 46C for cyan is disposed below the laser diode 46Y for yellow.

As illustrated in FIG. 5, the collimating lens 52Y and the cylindrical lens 53Y are attached to an upper surface of a second base 702. Although not illustrated, the collimating lens 52C for cyan is attached to the bottom surface of the second base 702 below the collimating lens 52Y for yellow. The cylindrical lens 53C is attached to the bottom surface of the second base 702 below the cylindrical lens 53Y.

The scanning lens 43K is disposed immediately above the scanning lens 43M. The scanning lens 43Y is disposed immediately above the scanning lens 43C. The scanning lenses 43Y, 43M, 43C, and 43K convert the angular motion of the scanning laser by the polygon mirrors 41a and 41b to linear motion, and focus the light in the sub-scanning direction. Furthermore, the scanning lenses 43Y, 43M, 43C, and 43K correct a face tangle error of the polygon mirrors.

As illustrated in FIG. 3, the optical systems for the colors magenta (M) and black (K) are disposed at the right side of the polygon scanner 50. The optical systems for the colors yellow (Y) and cyan (C) are disposed at the left side of the polygon scanner 50.

Figure 7:
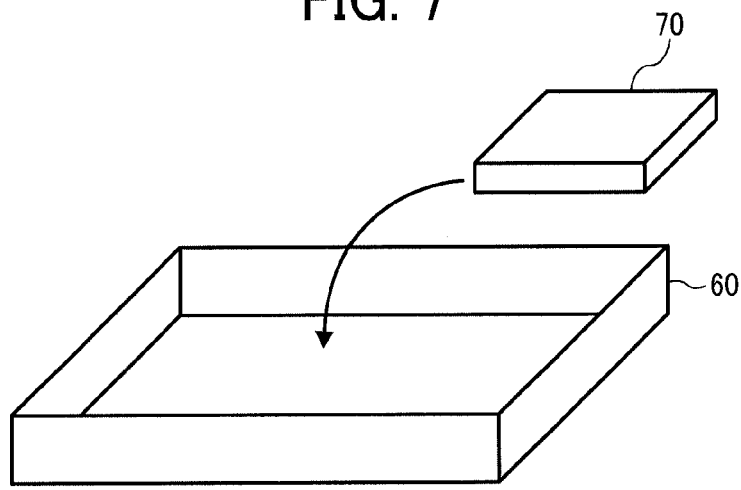
FIG. 7 is a schematic diagram illustrating the first enclosure installed in a second enclosure, according to an illustrative embodiment.

As illustrated in FIGS. 4 and 7, the first enclosure 70 is disposed substantially at the center of the second enclosure 60 such that the polygon scanner 50 comes substantially at the center of the optical writing unit 4. As illustrated FIG. 3, the cover 107 includes an opening at the center thereof. An inner wall 106 is provided such that the inner wall 106 extends from the opening of the cover towards the polygon scanner side. More specifically, the bottom end of the inner wall 106 contacts the upper surface of the soundproof glass panel panels 42a and 42b, as well as the upper surface of the soundproof wall 54 (shown in FIG. 5). A deflector cover 105 is provided to cover the opening of the cover 107. With this configuration, the polygon scanner 50 is sealed by the bottom surface of the housing 131, the soundproof glass panels 42a and 42b, the soundproof wall 54, the inner wall 106, and the deflector cover 105.

The write light beams Ly, Lc, Lm, and Lk projected from the laser diodes 46Y, 46C, 46M, and 46K, respectively, are collimated into parallel light fluxes by the collimating lenses 52Y, 52C, 52M, and 52K, and then pass through the cylindrical lenses 53Y, 53C, 53M, and 53K. After passing through the cylindrical lenses 53Y, 53C, 53M, and 53K, the light fluxes are focused in the sub-scanning direction (equivalent to the surface moving direction of the photoconductive drums 10 on the photoconductive drums 10). Subsequently, the light fluxes are reflected by the mirror surfaces of the polygon mirrors 41a and 41b rotated at high speed by the polygon motor, thereby deflecting the light fluxes in the main scanning direction (equivalent to the axial direction on the surface of the photoconductive drums 10). The moving speed of the light fluxes deflected in the main scanning direction at a constant angular velocity by the polygon mirrors 41a and 41b is converted into a constant speed by the scanning lenses 43Y, 43M, 43C, and 43K, while the light fluxes are focused in the sub-scanning direction, and the face tangle error of the mirror surfaces of the polygon mirrors 41a and 41b is corrected.

The write light beams Ly, Lc, Lm, and Lk passed through the scanning lenses 43Y, 43C, 43M, and 43K are directed to the respective reflective mirrors of the optical systems of yellow, cyan, magenta, and black. For example, the write light beam Ly for the color yellow passed through the scanning lens 43Y is reflected by a first reflective mirror 44Y and a second reflective mirror 45Y so that the write light beam Ly is directed to the surface of the photoconductive drum 10Y. Similar to the write light beam Ly, the write light beams Lc, Lm, and Lk are reflected by first reflective mirrors 44C, 44M, and 44K, and second reflective mirrors 45C, 45M, and 45K so that the write light beams Lc, Lm, and Lk are directed to the surfaces of the photoconductive drums 10C, 10M, and 10K. The write light beams Ly, Lc, Lm, and Lk reflected by the second reflective mirrors 45Y, 45C, 45M, and 45K pass through the dust proof glass panels 48Y, 48C, 48M, and 48K of the cover 107, and then arrive at the photoconductive drums 10Y, 10C, 10M, and 10K.

Figure 8:
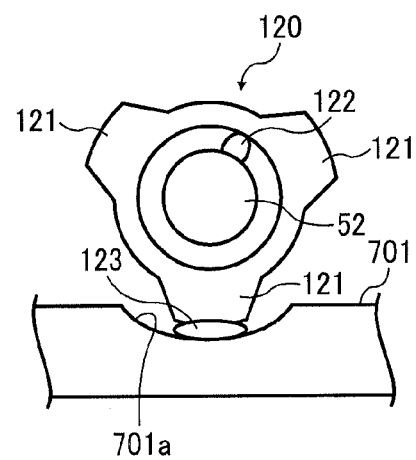
FIG. 8 is a schematic diagram illustrating a lens retainer and a collimating lens as viewed along an optical axis.
Figure 9:
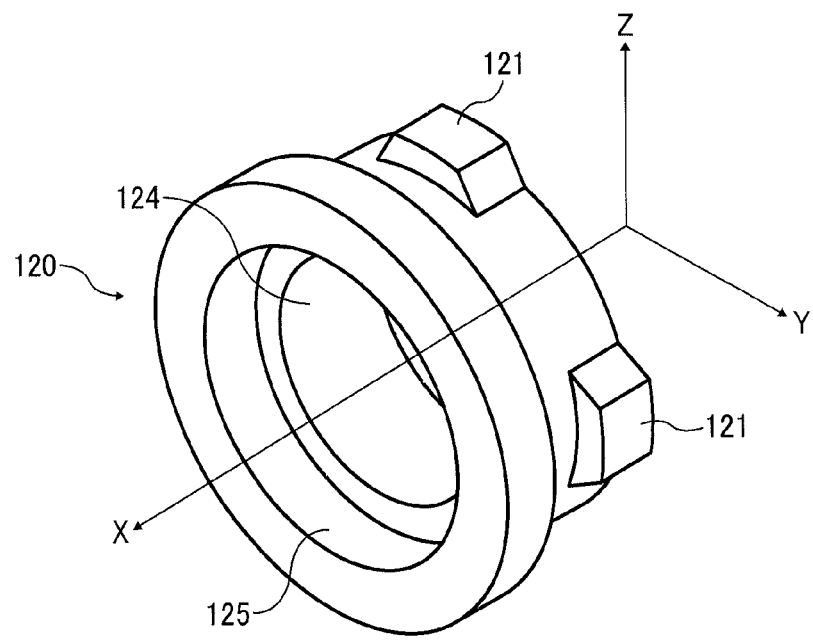
FIG. 9 is a perspective view schematically illustrating the lens retainer according to a first illustrative embodiment of the present invention.
Figure 10:
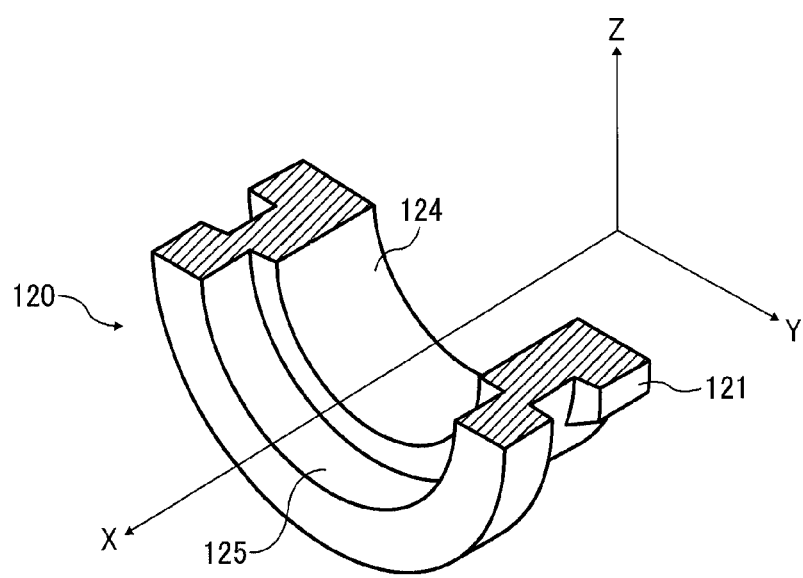
FIG. 10 is a cross-sectional perspective view schematically illustrating the lens retainer.

According to an illustrative embodiment, the collimating lens 52 is adhered to a lens retainer 120 which is adhered a base 701 (702) of the first enclosure 70. With reference to FIGS. 8 through 10, a description is provided of attachment of the collimating lens 52 to the lens retainer 120 according to an illustrative embodiment.

FIG. 8 is a schematic diagram illustrating a lens retainer 120 and the collimating lens 52 as viewed along an optical axis direction. FIG. 9 is a perspective view schematically illustrating the lens retainer 120 according to a first illustrative embodiment. FIG. 10 is a cross-sectional perspective view schematically illustrating the lens retainer 120.

As illustrated in FIGS. 8 and 9, the lens retainer 120 has a cylindrical shape and includes a plurality of flanges 121 provided equally spaced on the circumferential surface of the lens retainer 120. More specifically, the lens retainer 120 has three flanges 121 projecting from the circumferential surface thereof. The flanges 121 serve as attachment portions that are attached and fixed to the first enclosure 70.

The lens retainer 120 includes a plurality of lens mounting portions serving as optical parts mounts having different external diameters. More specifically, according to the present embodiment, the retainer 120 includes two lens mounting portions along the optical axis direction: a first lens mounting portion 124 and a second lens mounting portion 125. The external diameter of the first lens mounting portion 124 is different from that of the second lens mounting portion 125, and the collimating lens 52 can be attached to either the first lens mounting portion 124 or the second lens mounting portion 125. It should be noted that the number of the lens mounting portions is not limited to two.

The internal diameter of the first lens mounting portion 124 disposed on the lens retainer 120 at the flange side is smaller than the internal diameter of the second lens mounting portion 125. The first lens mounting portion 124 and the second lens mounting portion 125 are arranged coaxially along the optical axis. As illustrated in FIG. 8, the collimating lens 52 is fixed to the first lens mounting portion 124 or the second lens mounting portion 125 using an adhesive agent 122. The lens retainer 120 is formed of substantially transparent material that allows ultraviolet (UV) light to pass therethrough.

The collimating lens 52 is adhered to the lens retainer 120 by holding a flange or a ridge of the collimating lens 52 and inserting the collimating lens 52 into the lens retainer 120. Subsequently, the collimating lens 52 is disposed facing the first lens mounting portion 124 or the second lens mounting portion 125, and a portion of a space between the collimating lens 52 and the lens retainer 120 is filled in with a UV curable adhesive agent 122 and illuminated with UV light so that the adhesive agent 122 is cured. Accordingly, the collimating lens 52 is fixed to the lens retainer 120. Since the lens retainer 120 is made of material allowing the UV light to penetrate, the adhesive agent 122 can be illuminated with the UV light through the lens retainer 120. Accordingly, the collimating lens 52 is fixed to the lens retainer 120 with ease.

The lens retainer 120 holding the collimating lens 52 is attached to the base 701 of the first enclosure 70 as follows. First, the lens retainer 120 is held by a chuck, not illustrated, that can adjust the position of the lens retainer 120 in the axial direction, the sub-scanning direction (a direction perpendicular to the base of the first enclosure 70), and the main scanning direction (a direction orthogonal to both the axial direction and the sub-scanning direction). The base 701 includes a lens retainer mount 701a. One of the flanges 121 of the lens retainer 120 faces the lens retainer mount 701a of the base 701. Subsequently, while monitoring optical characteristics, the position of the lens retainer 120 is adjusted by moving the chuck such that desired optical characteristics of the scan light are obtained on the photoconductive drums 10.

After the desired optical characteristics are obtained, a portion of a space between the lens retainer mount 701a and the flange 121 is filled in with a UV curable adhesive agent 123, and illuminated with UV light so that the adhesive agent 123 is cured. Accordingly, the lens retainer 120 is fixed to the lens retainer mount 701a. According to the above-described illustrative embodiment, after adjusting the position of the lens retainer 120, the adhesive agent 123 enters the space between the lens retainer mount 701a and the flange 121. Alternatively, the position of the lens retainer 120 may be adjusted after the adhesive agent 123 enters the space between the lens retainer mount 701a and the flange 121.

Since the lens retainer 120 is made of material allowing the UV light to penetrate therethrough, the adhesive agent 123 can be illuminated with the UV light through the lens retainer 120. Accordingly, the lens retainer 120 is fixed to the lens retainer mount 701a with ease. After the intermediate member 120 is fixed, the chuck is removed.

When recycling the collimating lens 52, the lens retainer 120 is separated from the lens retainer mount 701a by handling the lens retainer 120. With this configuration, when recovering the collimating lens 52 from the optical writing unit 4, the collimating lens 52 is not held directly. Thus, the optical surfaces such as a light incident surface and a projection surface of the collimating lens 52 are prevented from getting touched by fingers and hence protected from damage. Furthermore, when separating from the lens retainer mount 701a, the collimating lens 52 receives no stress. As a result, when removing the collimating lens 52 from the optical writing unit 4, fluctuation of the optical characteristics of the collimating lens 52 is prevented.

Figure 11:
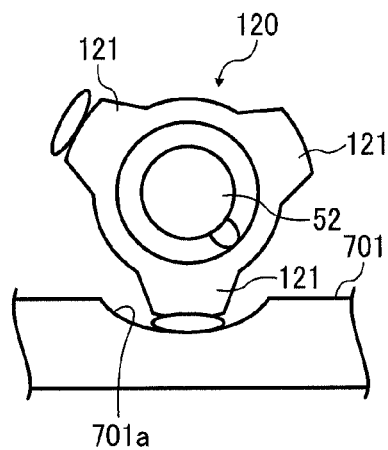
FIG. 11 is a schematic diagram illustrating the lens retainer adhered to a different lens mounting portion.

When using the recycled collimating lens 52 in another optical writing unit after the collimating lens 52 is removed from the optical writing unit 4, as illustrated in FIG. 11, one of the flanges 121, different from the one that has been used previously, is fixed to the lens retainer mount 701a using the adhesive agent. FIG. 11 is a schematic diagram illustrating one of the flanges 121, different from the one that has been used previously, is fixed to the lens retainer mount 701a using the adhesive agent 123.

According to the illustrative embodiment, the lens retainer 120 includes the plurality of flanges 121. As the collimating lens 52 is recycled, the flange 121 having a clean surface on which no adhesive agent or the like remains is attached to the lens retainer mount 701a of the first enclosure 70. Accordingly, the flange 121 is adhered reliably to the lens retainer mount 701a.

If the adhesive agent 123 remains undesirably on the surface of the flange 121 and such a flange is used again, not enough space is secured between the flange 121 and the lens retainer mount 701a due to the residual adhesive agent 123.

Consequently, an amount of the adhesive agent 123 to enter between the flange 121 and the lens retainer mount 701a is reduced, and thus the lens retainer 120 is not securely fixed to the lens retainer mount 701a. If this occurs, the lens retainer 120 separates undesirably from the lens mounting portion 701a due to vibration during shipment and/or during actual use. Furthermore, the surface of the flange 121 on which the adhesive agent 123 remains hinders adjustment of the position of the lens retainer 120 in the sub-scanning direction (the direction perpendicular to the base of the first enclosure 70), thereby complicating fine adjustment.

The polygon scanner 50, the laser diodes 46, and so forth in the optical writing unit 4 are also subjected to recycling when reaching the end of their product life cycles. When the polygon mirror 50 and the laser diodes 46 are replaced with new ones, the relative positions of the collimating lens 52 and these parts are changed, thereby complicating efforts to achieve desired optical characteristics. In order to achieve the desired optical characteristics, the orientation and the position of the collimating lens 52 need to be readjusted. In such a case, the collimating lens 52 needs to be separated from the first enclosure 70 by separating the lens retainer 120 from the lens retainer mount 701a. If the adhesive agent 123 remains on the lens retainer mount 701a, the lens retainer 120 does not adhere well to the lens retainer mount 701a. As a result, the optical writing unit 4 cannot be reused.

Figure 12:
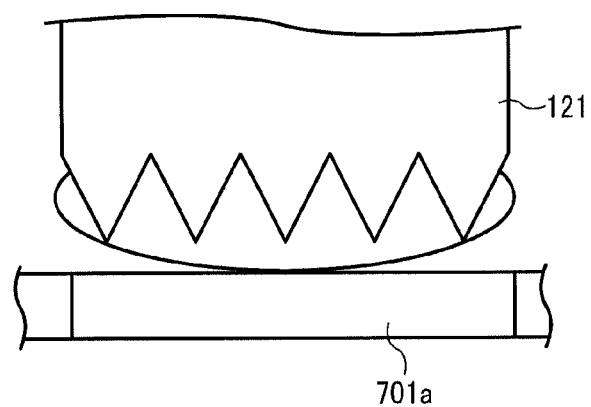
FIG. 12 is an enlarged schematic diagram illustrating the lens retainer adhered to the lens mounting portion.

In view of the above, according to the above-described illustrative embodiment, the adhesive agent 123 sticks to the lens retainer 120, rather than the lens retainer mount 701a, as the lens retainer 120 is separated from the first enclosure 70. More specifically, as illustrated in FIG. 12, the surface of the flange 121 adhered to the lens retainer mount 701a includes asperities so that the surface area of the flange 121 is greater than that of the lens retainer mount 701a. With this configuration, as the lens retainer 120 is separated from the lens retainer mount 701a, the adhesive agent 123 sticks to the lens retainer 120, thereby preventing the adhesive agent 123 from remaining on the lens retainer mount 701a.

As illustrated in FIG. 11, one of the flanges 121, other than the one that has been used previously, is disposed facing the lens retainer mount 701a and fixed thereto using the adhesive agent 123 after the position of the collimating lens 52 is adjusted. Accordingly, the adhesive agent 123 sticks to the lens retainer 120 as the lens retainer 120 is separated from the lens retainer mount 701a, thereby facilitating recycle of the optical writing unit 4.

Furthermore, as described above, the lens retainer 120 includes the plurality of lens mounting portions: the first lens mounting portion 124 and the second lens mounting portion 125. If the configuration of the optical writing unit 4 of the image forming apparatus changes, the configuration of the parts to be installed in the optical writing unit changes. More specifically, the collimating lens 52 is an important optical element that determines a beam spot diameter on the photoconductive drum 10.

Depending on the divergence angle of the laser diode 46 serving as a light source, an effective aperture of the lens changes, thus changing the external diameter of the collimating lens 52. If the lens retainer has only one lens mounting portion, the lens retainer cannot accommodate the collimating lens having a size different from the previous collimating lens. This means that the same lens retainer cannot be used in an optical writing unit having a different configuration. As a result, different lens retainers need to be manufactured to accommodate various optical writing units having different configurations, resulting in an increase in manufacturing and management cost for different lens retainers.

Furthermore, if there is a change in the configuration of the optical writing unit in which a collimating lens having an external diameter greater than that of the previous collimating lens is employed, the new collimating lens cannot fit in the lens retainer 120. Even though such a lens retainer still has the flange 121 that has not been used, the lens retainer cannot be recycled.

In view of the above, according to the illustrative embodiment, the lens retainer 120 includes the plurality of lens mounting portions, that is, the first lens mounting portion 124 and the second lens mounting portion 125. The internal diameter of the first lens mounting portion 124 is different from the second lens mounting portion 125 so that the lens retainer 120 can accommodate different optical writing units. For example, the collimating lens 52 is fixed to the first lens mounting portion 124 in the optical writing unit 4. When an optical writing unit has a different configuration, for example, when the external diameter of the collimating lens is larger than that of the previous collimating lens, the collimating lens is attached to the second lens mounting portion 125. Because the lens retainer 120 has the plurality of lens mounting portions 124 and 125, the same lens retainer 120 can be used in the optical writing unit having a different configuration. Accordingly, manufacturing and management cost for different lens retainers do not incur.

With this configuration, even if the external diameter of a collimating lens is larger than the previous collimating lens, the same lens retainer, that is, the retainer 120 can be used. In this case, the collimating lens attached to the first lens mounting portion is removed, and the new collimating lens having the different configuration is attached to the second lens mounting portion. Subsequently, the flange 121 that has not been used is attached to the enclosure. Accordingly, the lens retainer 120 is recycled.

Since the lens retainer 120 is provided with the plurality of lens mounting portions having different internal diameters, the difference in the internal diameter of the first lens mounting portion 124 and the second lens mounting portion 125 produces a level difference between the first lens mounting portion 124 and the second lens mounting portion 125 in the optical axis direction. In a case in which the collimating lens is attached to the second lens mounting portion 125, the edges of the incident or the projection surface of the collimating lens faces the level difference portion. Therefore, the internal diameter of the first lens mounting portion 124 is larger than the effective aperture of the collimating lens to be attached to the second lens mounting portion 125.

Figure 13:
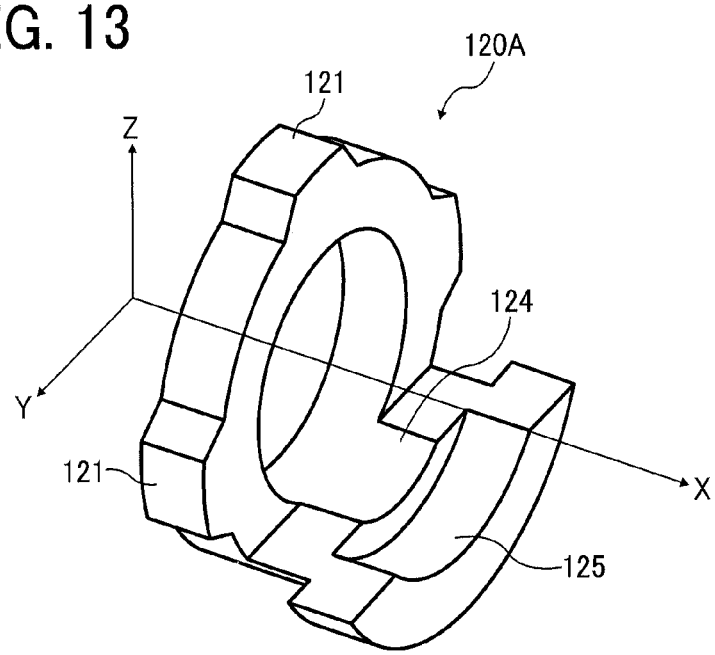
FIG. 13 is a perspective view schematically illustrating the lens retainer according to a second illustrative embodiment.

With reference to FIG. 13, a description is provided of a second illustrative embodiment. FIG. 13 is a perspective view schematically illustrating a lens retainer 120A according to the second illustrative embodiment. As illustrated in FIG. 13, the first lens mounting portion 124 and the second lens mounting portion 125 of the lens retainer 120A have a semi-cylinder shape.

As described above, the collimating lens 52 is attached to the first lens mounting portion 124 or the second lens mounting portion 125 such that a flange or a ridge of the collimating lens 52 is held by a jig or the like and aligned facing the first or the second lens mounting portion. Subsequently, the adhesive agent is filled in between the collimating lens 52 and the lens mounting portion, thereby fixing the collimating lens 52 to the lens mounting portion. In a case in which the lens mounting portions 124 and 125 have a cylindrical shape as described with reference to FIG. 9, the collimating lens 52 held by the jig needs to be fitted into the cylinder-shaped lens mounting portions, complicating installation and attachment of the collimating lens 52.

By contrast, according to the second illustrative embodiment, the semicylinder shaped first and the second lens mounting portions facilitate arrangement of the collimating lens held by the jig relative to the first or the second lens mounting portions. That is, the collimating lens 52 can face and be attached to the first or the second lens mounting portion with ease.

Figure 14:
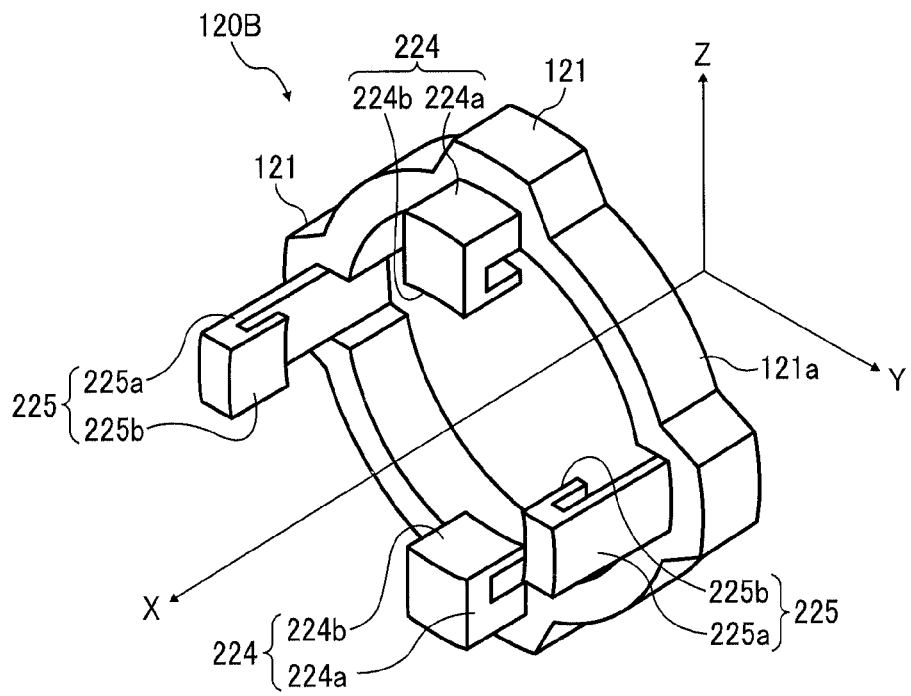
FIG. 14 is a perspective view schematically illustrating the lens retainer according to a third illustrative embodiment.

With reference to FIG. 14, a description is provided of a third illustrative embodiment. FIG. 14 is a perspective view schematically illustrating a lens retainer 120B according to the third illustrative embodiment.

As illustrated in FIG. 14, the lens retainer 120B includes two first leaf springs 224 and two second leaf springs 225, each serving as the lens mounting portions. The collimating lens 52 is interposed between the first leaf springs 224 or between the second leaf springs 225, thereby mounting the collimating lens 52 on the lens retainer 120B.

The leaf spring 224 consists of a leg portion 224a and a contact portion 224b. The leg portion 224a extends from an annular portion 121a provided with the flanges 121. The contact portion 224b refers to a portion of the leg portion 224a folded inward from the leading edge of the leg portion 224a to contact the outer circumferential surface of the collimating lens 52.

The leaf spring 225 consists of a leg portion 225a and a contact portion 225b. The leg portion 225a extends from the annular portion 121a provided with the flanges 121. The contact portion 225b refers to a portion of the leg portion 225a folded inward from the leading edge of the leg portion 225a to contact the outer circumferential surface of the collimating lens 52.

According to the present embodiment, the plurality of first leaf springs 224, here, two first leaf springs 224 are provided to the annular portion 121a and serve as the first lens mounting portion. The first leaf springs 224 are disposed 180° apart. The plurality of second leaf springs 225, here, two second leaf springs 225, are provided to serve as the second lens mounting portion. Each of the second leaf springs 225 is disposed 90° apart from the first leaf springs 224.

Figure 15:
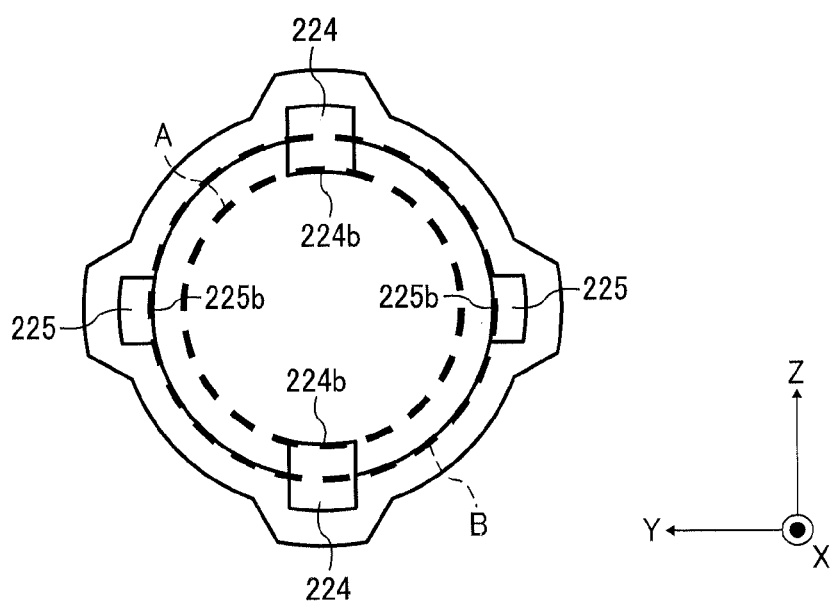
FIG. 15 is a front view schematically illustrating the lens retainer of FIG. 14.

FIG. 15 is a front view schematically illustrating the lens retainer 120B according to the third illustrative embodiment. As illustrated in FIG. 15, an incircle A indicated by a broken line along the contact portions 224b of the first leaf springs 224 is smaller than the external diameter of a collimating lens 52A (shown in FIG. 16) employed in an optical writing unit. An incircle B indicated by a broken line along the contact portions 225b of the second leaf springs 225 is smaller than the external diameter of a collimating lens 52B (shown in FIG. 17) employed in another optical writing unit having a different configuration.

Figure 16:
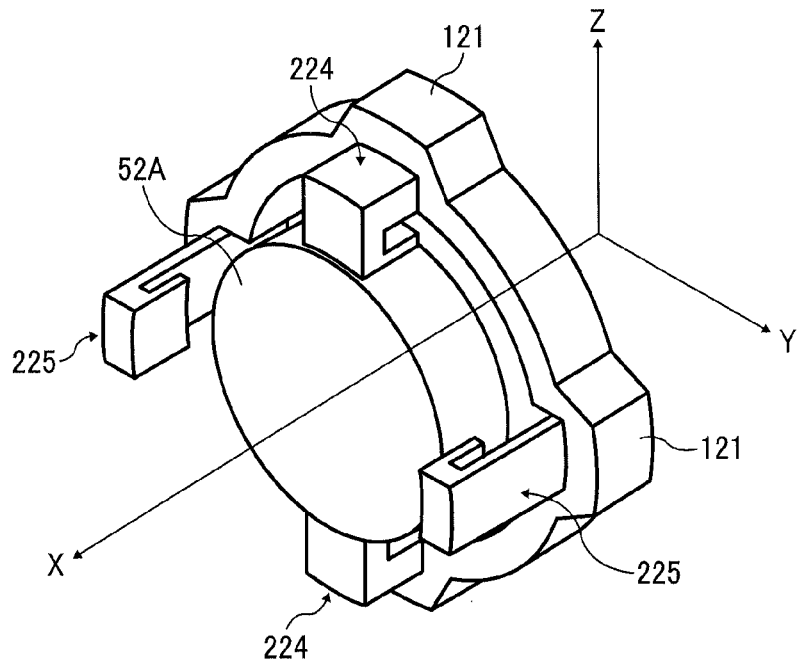
FIG. 16 is a perspective view schematically illustrating the collimating lens attached to a first lens mount of the lens retainer of the third illustrative embodiment.
Figure 17:
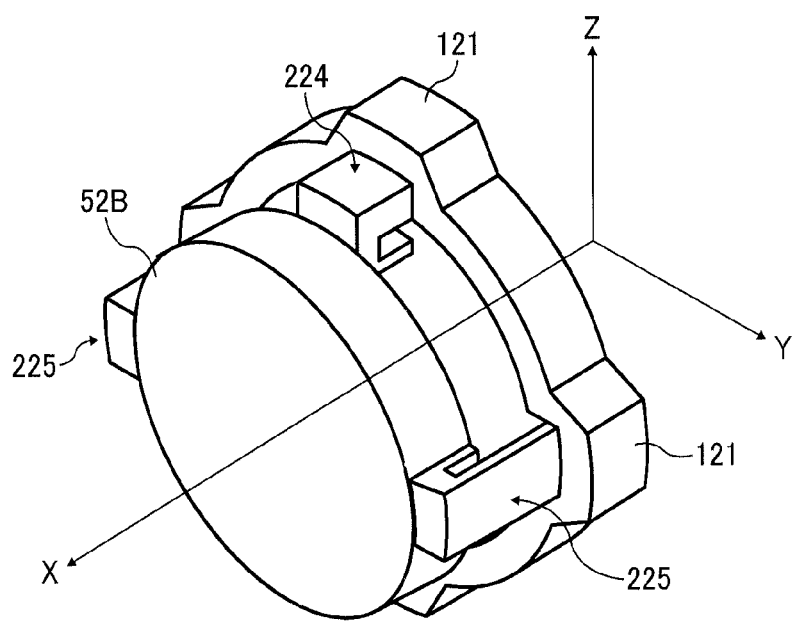
FIG. 17 is a perspective view schematically illustrating the collimating lens attached to a second lens mount of the lens retainer of the third illustrative embodiment.

FIG. 16 is a perspective view schematically illustrating the collimating lens 52A attached to the first leaf springs 224 serving as the first lens mount of the lens retainer. FIG. 17 is a perspective view schematically illustrating the collimating lens 52B attached to the second leaf springs 225 serving as the second lens mount of the lens retainer.

As illustrated in FIG. 16, when the collimating lens 52A is mounted to the first lens mount, that is, the first leaf springs 224, the leg portions 224a and the contact portions 224b of the first leaf springs 224 bend outward, and resilience of the first leaf springs 224 biases the collimating lens 52A inward. Accordingly, the collimating lens 52A can be held reliably by two first leaf springs 224. Similarly, as illustrated in FIG. 17, when the collimating lens 52B is mounted on the second lens mount, that is, the second leaf springs 225, the leg portions 225a and the contact portions 225b of the second leaf springs 225 bend outward, and resilience of the second leaf springs 225 biases the collimating lens 52B inward. Accordingly, the collimating lens 52B can be held reliably by two second leaf springs 225.

With this configuration, the collimating lens 52 is fixed to the lens retainer 120 without an adhesive agent so that when removing the collimating lens 52 from the lens retainer 120, no stress is applied to the collimating lens 52, preventing fluctuations of optical characteristics. Furthermore, since no adhesive agent is used to fix the collimating lens 52 to the lens retainer, the adhesive agent does not remain on the outer circumferential surface of the collimating lens 52. Accordingly, the collimating lens removed from the lens retainer 120 can be recycled.

Figure 18:
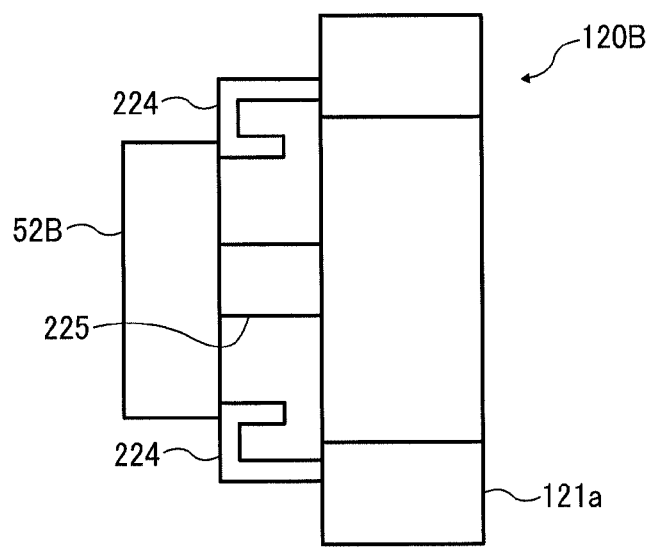
FIG. 18 is a cross-sectional view schematically illustrating the collimating lens attached to the second lens mount of the lens retainer of the third illustrative embodiment.

As illustrated in FIG. 18, when the collimating lens 52B is held by the second leaf springs 225, an edge portion of the projection surface of the collimating lens 52B may contact the first leaf springs 224 to position the collimating lens 52B in place. FIG. 18 is a cross-sectional view schematically illustrating the collimating lens 52B held by the second leaf springs 225.

Figure 19:
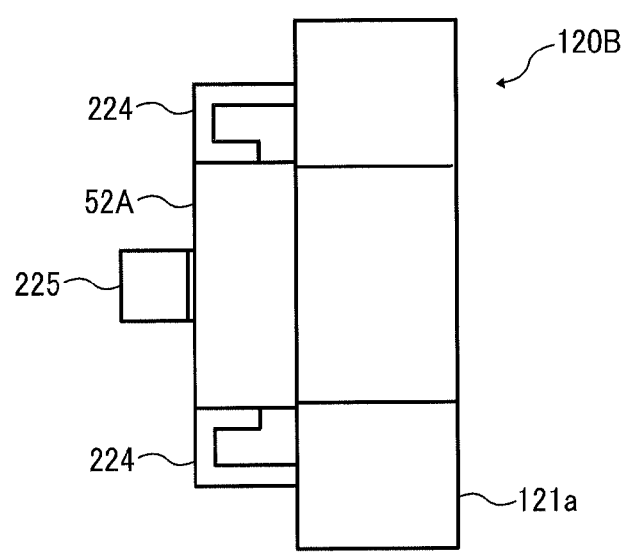
FIG. 19 is a cross-sectional view schematically illustrating the collimating lens attached to the first lens mount of the lens retainer of the third illustrative embodiment.

Alternatively, as illustrated in FIG. 19, the internal diameter of the annular portion 121a of the lens retainer 120B may be slightly smaller than the external diameter of the collimating lens 52A to be held by the first leaf springs 224. As the edge portion of the projection surface of the collimating lens 52A contacts the annular portion 121a of the lens retainer 120B, the collimating lens 52A is positioned in place.

FIG. 19 is a cross-sectional view schematically illustrating the collimating lens 52A held by the leaf springs 224. Alternatively, the leading edge of the contact portion 224b of the first leaf spring 224 may be provided with a projection extending inward which contacts the collimating lens 52A.

Further alternatively, as illustrated in FIG. 20, the lens retainer 120B may include a projection 128 projecting further from the collimating lens 52B in the optical axis direction. FIG. 20 is a perspective view schematically illustrating the lens retainer 120B with the projections 128. More specifically, the projection 128 projects from the surface of the lens retainer 120B beyond the collimating lens 52B in the optical axis direction.

During assembly and recycling operation, the lens retainer 120 including the collimating lens 52 needs to be removed from the enclosure. If the retainer 120 does not have the projection 128 as illustrated in FIG. 17, when removing the retainer 120 from the enclosure and placing it on a table and the like temporarily, the optical surface (the light projection surface and the light incident surface) of the collimating lens 52 directly touches the table, thereby getting damaged. By contrast, the projections 128 prevent the optical surface of the collimating lens 52 from directly touching the table and the like, thereby protecting the collimating lens 52 from damage. In other words, the projections 128 touch the table and the like before the collimating lens. When the collimating lens 52 is dropped accidentally, the projections 128 contact the floor, thereby preventing the lens surface of the collimating lens 52 held by the lens retainer 120 from getting damaged. With this configuration, handling of the lens retainer 120 holding collimating lens 52 is made easier.

With reference to FIGS. 21A and 21B, a description is provided of recycle of a laser diode (hereinafter "LD") unit 200 equipped with the laser diode 46 and the collimating lens 52. FIG. 21A is a perspective view schematically illustrating the LD unit 200 before the lens retainer 120 is attached thereto. FIG. 21B is a perspective view schematically illustrating the LD unit 200 after the lens retainer 120 is attached thereto.

As illustrated in FIG. 21A, the LD unit 200 includes a cylinder portion 201, an adjuster 202, and a separation wall 203 having a lens mounting portion 203a. The cylinder portion 201 is attached to the enclosure of the optical writing unit 4 by fitting into a through hole formed in a surface of the housing of the optical writing unit 4. The adjuster 202 adjusts orientation of the LD unit 200 using an adjusting screw, not illustrated, to be fastened to the adjuster 202. As illustrated in 21B, the lens retainer 120 bearing the collimating lens 52 is adhered to the lens mounting portion 203a of the separation wall 203 that divides the cylinder portion 201 of the LD unit 200.

In a case in which the product life cycle of the laser diode reaches the end and the laser diode is replaced, the positional relation between the laser diode 46 and the collimating lens 52 changes. Thus, the position of the collimating lens 52 needs to be adjusted again. In such a case, similar to the foregoing embodiments, the lens retainer 120 is separated from the lens mounting portion 203a, and the different attachment surface of the lens retainer 120 is positioned facing the lens mounting portion 203a, and the position is adjusted.

Subsequently, the lens retainer 120 is fixed to the lens mounting portion 203a using the adhesive agent. Accordingly, the LD unit 200 can be recycled. In a case in which the LD unit 200 can no longer be used in an image forming apparatus due to a change in a specification or the like, the lens retainer 120 bearing the collimating lens 52 can be removed from the LD unit 200 and used in a different optical writing unit.

The collimating lens 52 is an optical element having the optical characteristics that do not change even when the collimating lens 52 is rotated about the optical axis. When using such an optical element, a portion of the lens retainer 120 may have an annular shape, and the outer circumferential surface thereof may be provided with the plurality of flanges.

According to an aspect of this disclosure, the present invention is employed in the image forming apparatus. The image forming apparatus includes, but is not limited to, an electrophotographic image forming apparatus, a copier, a printer, a facsimile machine, and a digital multi-functional system.

Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. An optical scanner, comprising:
a light source to project light in a direction of an optical axis against a target;
an optical part disposed on a light path between the light source and the target;
an enclosure to house the light source and the optical part; and
a retainer fixed to the enclosure at least a portion of the retainer having an annular shape and including a plurality of optical part mounts, each of the optical part mounts having a semi-annular shape and the optical part being mounted, using an adhesive, within the retainer in one of the plurality of optical part mounts chosen based on a diameter of the mounted optical part, the plurality of optical part mounts having a step increase in diameter along the direction of the optical axis such that the diameter of each of the optical part mounts is larger than an effective aperture of an optical part configured to be mounted in a next one of the plurality of optical part mounts in the direction of the optical axis.

2. The optical scanner according to claim 1, wherein the retainer comprises:
a plurality of attachment portions, one of the attachment portions attached to the enclosure upon installation.

3. The optical scanner according to claim 2, wherein the plurality of attachment portions comprise flanges.

4. The optical scanner according to claim 2, wherein the optical part is an optical element having optical characteristics that remain constant about an optical axis,
wherein at least a portion of the retainer has an annular shape, and the plurality of attachment portions are provided at predetermined intervals along an outer circumferential surface of the annular portion.

5. The optical scanner according to claim 2, wherein a surface area of the attachment portion is greater than the surface area of a mounting portion of the enclosure to which the attachment portion is attached.

6. The optical scanner according to claim 1, wherein the retainer includes a projection that projects from the surface of the retainer beyond the optical part in the optical axis direction.

7. The optical scanner according to claim 1, wherein the optical part is a collimating lens.

8. The optical scanner according to claim 1, wherein the retainer is made of material having high ultraviolet (UV) light transmissivity.

9. An optical scanner comprising:
a light source to project light in a direction of an optical axis against a target;
an optical part disposed on a light path between the light source and the target;
an enclosure to house the light source and the optical part; and
a retainer fixed to the enclosure at least a portion of the retainer having an annular shape and including a plurality of optical part mounts, the optical part being mounted, using an adhesive, within the retainer in one of the plurality of optical part mounts chosen based on a diameter of the mounted optical part, the plurality of optical part mounts having a step increase in diameter along the direction of the optical axis such that the diameter of each of the optical part mounts is larger than an effective aperture of an optical part configured to be mounted in a next one of the plurality of optical part mounts in the direction of the optical axis, wherein
the plurality of optical part mounts include leaf springs that interpose the optical part therebetween to fix the optical part in place.

10. The optical scanner according to claim 9, wherein the leaf springs are disposed at predetermined intervals along the circumference of the retainer.

11. An optical scanner comprising:
a light source to project light in a direction of an optical axis against a target;
an optical part disposed on a light path between the light source and the target;
an enclosure to house the light source and the optical part; and a retainer fixed to the enclosure at least a portion of the retainer having an annular shape and including a plurality of optical part mounts, the optical part being mounted, using an adhesive, within the retainer in one of the plurality of optical part mounts chosen based on a diameter of the mounted optical part, the plurality of optical part mounts having a step increase in diameter along the direction of the optical axis such that the diameter of each of the optical part mounts is larger than an effective aperture of an optical part configured to be mounted in a next one of the plurality of optical part mounts in the direction of the optical axis, wherein the plurality of optical part mounts include two pairs of leaf springs of different sizes, each leaf spring of one pair disposed 180° apart from the other leaf spring of the same pair and 90° apart from either leaf spring of the other pair.

12. An image forming apparatus, comprising:

an image bearing member to bear a latent image on a surface thereof;

an optical scanner configured to illuminate the surface of the image bearing member with light to form the latent image thereon, the optical scanner including, a light source to project light in a direction of an optical axis against a target, an optical part disposed on a light path between the light source and the target, an enclosure to house the light source and the optical part, and a retainer fixed to the enclosure at least a portion of the retainer having an annular shape and including a plurality of optical part mounts, the optical part being mounted, using an adhesive, within the retainer in one of the plurality of optical part mounts chosen based on a diameter of the mounted optical part, the plurality of optical part mounts having a step increase in diameter along the direction of the optical axis such that the diameter of each of the optical part mounts is larger than an effective aperture of an optical part configured to be mounted in a next one of the plurality of optical part mounts in the direction of the optical axis; and a developing device to develop the latent image formed on the image bearing member using toner.

* * * * *